UNITED STATES PATENT OFFICE.

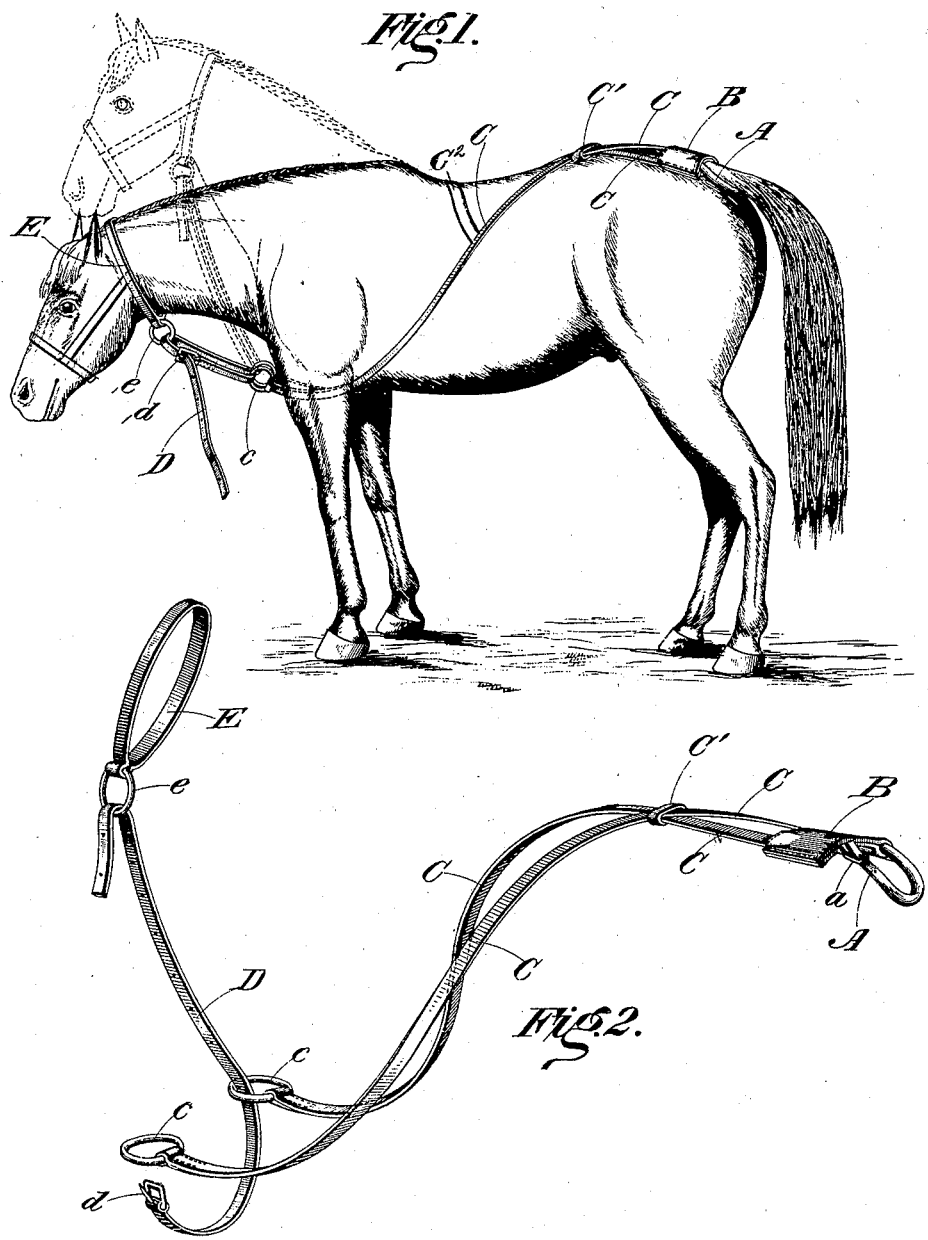

CHARLES S. MARSHALL, OF HUME, VIRGINIA.

ANTIJUMPING STRAP.

SPECIFICATION forming part of Letters Patent No. 647,102, dated April 10, 1900.

Application filed July 14, 1899. Serial No. 723,821. (No model.)

*To all whom it may concern:*

Be it known that I, CHARLES S. MARSHALL, of Hume, in the county of Fauquier and State of Virginia, have invented certain new and useful Improvements in Antijumping Straps; and I hereby declare that the following is a full, clear, and exact description thereof, reference being had to the accompanying drawings, which form part of this specification.

This invention is an improved means for preventing horses and other stock jumping; and its object is to provide an apparatus which will be really efficient without being cumbersome or painful to the animal in working and will not interfere with its ordinary movements.

It consists in a harness by which the animal may be prevented from lifting its head as high as it is obliged to do in the act of jumping, and an efficient form thereof is illustrated in the accompanying drawings, wherein—

Figure 1 is a side view of the device as applied to a horse. Fig. 2 is an enlarged perspective view thereof detached.

The device consists, essentially, of a crupper, to which are connected two straps passed forwardly from the crupper, partially over the back, and down between the fore legs of the animal, and the front ends are connected to a head or neck halter, so that the animal cannot raise its head above the level of the back or sufficiently to jump over fences, &c., although perfect freedom of movement is allowed to the limbs and body of the animal and to the head and neck below a certain level, so that the ordinary movements of the animal in grazing, walking, lying, rolling, &c., are not interfered with, and thus the device is more humane and comfortable than the clumsy or painful apparatus generally heretofore employed. If the animal wishes to jump, it is necessary in so doing to raise its head above the level of its back, and if it attempts to do this the harness is tightened, so that in lifting its head above the limit of the harness a severe jerk or pull is given to its tail, which will discourage any attempt at jumping and will also absolutely prevent the lifting of the head to the height necessary to enable the animal to jump.

As shown in the drawings, the apparatus comprises a crupper A, which is preferably provided with a buckle $a$, as usual, or other suitable device to facilitate its insertion in place, and this crupper is attached to a pad B, to which are connected two straps C C, which are crossed over each other at the loop or point C' on the back of the animal, passed down under its fore legs, and are connected at their front ends to an adjustable strap D by any suitable means or, as shown in the drawings, by means of rings $c\ c$, through which strap D passes. Strap D is provided with a buckle $d$, so that it may be lengthened or shortened at will, and it is connected to a ring $e$ on a halter E, which may be either a head or neck halter, a neck-halter being shown in Fig. 2 and a head-halter in Fig. 1. By taking up or letting out strap D the height to which the animal can raise its head is regulated and the downward and other movements of the body of the animal are not interfered with. The dotted position of the head in Fig. 1 shows the natural position of the head in preparing to jump or when the strap D is let out to rest the animal's neck.

From the drawings and the foregoing description the operation of the apparatus will be apparent. Its effectiveness in preventing jumping of the animal, with the accompanying advantages of otherwise perfect freedom of movement and absence of anything which might injure the animal, will be immediately recognized by stock owners.

If desired, I may employ a connecting-strap $C^2$ between the straps C C, as indicated in Fig. 1. This strap may be passed either over the back or under the belly of the animal and is not indispensable. The pad B is not indispensable, as the strap C might be connected directly to the crupper A.

Of course the invention is not restricted to any particular form of halter nor to the particular connection between the head and tail of the animal, as the essential feature of the invention is in providing some device by which if it attempts to jump the act of straightening out to make the jump will jerk the spine or wrench the tail of the animal by reason of the harness connecting the head and tail, which I have found absolutely effective in practice in breaking the worst jumpers of such habit.

Having thus described my invention, what I therefore claim as new, and desire to secure by Letters Patent thereon, is—

1. An antijumping device for stock, comprising a crupper, a halter, and connections between the halter and the crupper, said connections being guided below the level of the shoulders of the animal and then up to the halter, whereby if the animal attempts to jump, thereby lifting its head, the connections between the halter and crupper will be tautened and wrench its spine, substantially as described.

2. An antijumping harness for stock, comprising a crupper, a halter, and connections between the crupper and the halter, said connections passing between the fore legs of the animal, for the purpose and substantially as described.

3. In an antijumping device for stock, the combination of the crupper, the halter, and the adjustable connections between the halter and the crupper, said connections passing from the crupper, down under the fore legs of the animal to the halter, substantially as described.

4. In an antijumping harness for stock, the combination of a crupper, the bands connected to the crupper and passing over the animal's back and down under the fore legs thereof, a halter, and the strap connecting said halter to the front end of said strap, substantially as described.

5. In an antijumping device, the combination of the crupper A, the pad B, the crossed straps C connected to the crupper and passing across the back and down under the fore legs of the animal, having rings c on their front ends, the halter E, and the adjustable strap D, connecting rings e and the halter, substantially as described.

In testimony that I claim the foregoing as my own I affix my signature in presence of two witnesses.

CHARLES S. MARSHALL.

Witnesses:
JOHN MARSHALL,
E. T. PHILLIPS.